(12) United States Patent
Ganapathiraman et al.

(10) Patent No.: US 8,758,717 B2
(45) Date of Patent: Jun. 24, 2014

(54) ELECTRICAL CURRENT-INDUCED STRUCTURAL CHANGES AND CHEMICAL FUNCTIONALIZATION OF CARBON NANOTUBES

(75) Inventors: Ramanath Ganapathiraman, Clifton Park, NY (US); Saurabh Agrawal, Troy, NY (US); Raghuveer S. Makala, Sunnyvale, CA (US)

(73) Assignee: Rensselaer Polytechnic Institute, Troy, NY (US)

( * ) Notice: Subject to any disclaimer, the term of this patent is extended or adjusted under 35 U.S.C. 154(b) by 123 days.

(21) Appl. No.: 11/874,543

(22) Filed: Oct. 18, 2007

(65) Prior Publication Data

US 2008/0292531 A1    Nov. 27, 2008

Related U.S. Application Data (60) Provisional application No. 60/852,935, filed on Oct. 19, 2006.

(51) Int. Cl.
*D01F 9/12*    (2006.01)
*B01J 19/08*   (2006.01)
*B82Y 40/00*   (2011.01)
*C01B 31/00*   (2006.01)

(52) U.S. Cl.
CPC .............. *B82Y 40/00* (2013.01); *C01B 31/00* (2013.01); *D01F 9/12* (2013.01); *Y10S 977/752* (2013.01); *Y10S 977/842* (2013.01); *Y10S 977/847* (2013.01)
USPC ................ 423/447.2; 423/447.1; 423/445 B; 977/752; 977/842; 977/847

(58) Field of Classification Search
None
See application file for complete search history.

(56) References Cited

U.S. PATENT DOCUMENTS

| 7,091,096 | B2* | 8/2006 | Balasubramanian et al. 438/292 |
| 7,105,596 | B2* | 9/2006 | Smalley et al. ................ 524/495 |
| 7,326,605 | B2* | 2/2008 | Choi et al. ....................... 438/197 |
| 7,754,054 | B2* | 7/2010 | Mitra et al. ............... 204/157.15 |
| 7,767,114 | B2* | 8/2010 | Gordon et al. ................ 252/506 |
| 2002/0173083 | A1* | 11/2002 | Avouris et al. ................ 438/129 |
| 2002/0179434 | A1* | 12/2002 | Dai et al. ........................ 204/242 |
| 2003/0086858 | A1* | 5/2003 | Niu et al. .................... 423/447.1 |
| 2004/0202603 | A1* | 10/2004 | Fischer et al. ............. 423/447.2 |
| 2006/0239888 | A1* | 10/2006 | Nuber ........................ 423/445 B |
| 2011/0053050 | A1* | 3/2011 | Lim et al. ....................... 429/524 |

FOREIGN PATENT DOCUMENTS

JP    2004315253 A  * 11/2004

OTHER PUBLICATIONS

Brown et al.; Oxidative Functionalization of Carbon Nanotubes in Atmospheric Pressure Filamentary Dielectric Barrier Discharge (APDBD); Carbon; 43, 2951-2959; 2005.*

(Continued)

*Primary Examiner* — Guinever Gregorio
(74) *Attorney, Agent, or Firm* — Foley & Lardner LLP (57) ABSTRACT

A method of cutting, thinning, welding and chemically functionalizing multiwalled carbon nanotubes (CNTs) with carboxyl and allyl moieties, and altering the electrical properties of the CNT films by applying high current densities combined with air-exposure is developed and demonstrated. Such welded high-conductance CNT networks of functionalized CNTs could be useful for device and sensor applications, and may serve as high mechanical toughness mat fillers that are amenable to integration with nanocomposite matrices.

9 Claims, 6 Drawing Sheets (56) References Cited

OTHER PUBLICATIONS

Agrawal et al., "Directed Growth and Electrical-Transport Properties of Carbon Nanotube Architectures on Indium Tin Oxide Films on Silicon-Based Substrates," Adv. Funct. Mater., 2005, 15:1922-1926.
Banhart et al., "Self-Compression and Diamond Formation in Carbon Onions," Adv. Mater., 1997, 9(3):261-263.
Capaz et al., "Temperature Dependence of the Band Gap of Semiconducting Carbon Nanotubes," Physical Review Letters, Jan. 28, 2005, 95:036801-1 to 036804-4.
Chen et al., "Aligning single-wall carbon nanotubes with an alternating-current electric field," Applied Physics Letters, Jun. 4, 2001, 78(23):3714-3716.
Collins et al., "Intershell Conductance of Multiwalled Carbon Nanotubes," AIP Conference Proceedings, 2002, 633:223-226.
Cumings et al., "Peeling and sharpening multiwall nanotubes," Nature, Aug. 10, 2000, 406:286.
Dai et al., "Probing Electrical Transport in Nanomaterials: Conductivity of Individual Carbon Nanotubes," Science, Apr. 26, 1996, 272:523-526.
De Silva et al., "Bundling up Carbon Nanotubes through Wigner Defects," Nano Letters, 2005, 5(6):1045-1049.
Ebbesen et al., "Large-scale synthesis of carbon nanotubes," Nature, Jul. 16, 1992, 358:220-222.
Hirayama et al., "Nanospot welding of carbon nanotubes," Applied Physics Letters, Aug. 20, 2001, 79(8):1169-1171.
Kis et al., "Reinforcement of single-walled carbon nanotube bundles by intertube bridging," Nature Materials, Mar. 2004, 3:153-157.
Normand et al., "Investigation of carbon aggregates (onions) formed on copper under the conditions of diamond chemical vapour deposition," Philosophical Magazine A, 1999, 79(7):1739-1756.
Li et al., "Bottom-up approach for carbon nanotube interconnects," Applied Physics Letters, Apr. 14, 2003, 82(15):2491-2493.
Miko et al., "Effect of electron irradiation on the electrical properties of fibers of aligned single-walled carbon nanotubes," Applied Physics Letters, Dec. 1, 2003, 83(22):4622-4624.
Ngo et al., "Electron Transport Through Metal-Multiwall Carbon Nanotube Interfaces," IEEE Transactions on Nanotechnology, Jun. 2004, 3(2):311-317.
Ouyang et al., "Energy Gaps in 'Metallic' Single-Walled Carbon Nanotubes," Science, Apr. 27, 2001, 292:702-705.
Paulson et al., "Tunable Resistance of a Carbon Nanotube-Graphite Interface," Science, Dec. 1, 2000, 290:1742-1744.
Pomoell et al., "Ion ranges and irradiation-induced defects in multiwalled carbon nanotubes," Journal of Applied Physics, Sep. 1, 2004, 96(5):2864-2871.
Raghuveer et al., "Nanomachining carbon nanotubes with ion beams," Applied Physics Letters, May 31, 2004, 84(22):4484-4486.
Raghuveer et al., "Site-Selective Functionalization of Carbon Nanotubes," Adv. Mater., 2006, 18:547-552.
Ruoff et al., "Single Crystal Metals Encapsulated in Carbon Nanoparticles," Science, Jan. 15, 1993, 259:346-348.
Stadermann et al., "Nanoscale study of conduction through carbon nanotube networks," Physical Review B, 2004, 69:201402-1 to 201402-3.
Stone et al., "Theoretical studies of icosahedral $C_{60}$ and some related species," Chemical Physics Letters, Aug. 8, 1996, 128(5,6):504-503.
Sun et al., "Bridging the joint gap with wire feed laser welding," Journal of Materials Processing Technology, 1999, 87:213-222.
Terrones et al., "Molecular Junctions by Joining Single-Walled Carbon Nanotubes," Aug. 12, 2002, 89(7):075505-1 to 075505-4.
Wang et al., "Trapping and aligning carbon nanotubes via substrate geometry engineering," New Journal of Physics, 2004, 6(15):1-7.
Wei et al., "Carbon nanotube filaments in household light bulbs," Applied Physics Letters, Jun. 14, 2004, 84(24):4869-4871.
Wei et al., "Organized assembly of carbon nanotubes," Nature, Apr. 4, 2002, 416:495-496.
Yao et al., "High-Field Electrical Transport in Single-Wall Carbon Nanotubes," Physical Review Letters, Mar. 27, 2000, 84(13):2941-2944.

\* cited by examiner

ELECTRICAL CURRENT-INDUCED STRUCTURAL CHANGES AND CHEMICAL FUNCTIONALIZATION OF CARBON NANOTUBES

CROSS-REFERENCE TO RELATED PATENT APPLICATIONS

This application claims priority to U.S. Provisional Application 60/852,935, filed on Oct. 19, 2006, which is incorporated herein by reference in its entirety.

STATEMENT REGARDING FEDERALLY-SPONSORED RESEARCH OR DEVELOPMENT

This invention was made with Government support under grant number ECS 424322 awarded by the National Science Foundation. The Government has certain rights in the invention.

BACKGROUND OF THE INVENTION

The present invention relates generally to the field of carbon nanotubes (CNTs).

Many envisioned CNT-based applications such as device interconnections in integrated circuits require directed growth of aligned CNTs, and low-resistance high-strength CNT junctions with tunable chemistry, stability and electronic properties. Significant progress has been made in directing the growth of CNT bundles, and utilizing them as interlayer interconnects. However, forming CNT-CNT junctions on the substrate plane in a scalable fashion, to enable in-plane device circuitry and interconnections, remains to be realized. Even in small-scale test-structures with overlapping CNTs created through nanoprobe manipulation and electrofluidic techniques, transforming the high contact resistance at overlapping CNTs to low-resistance CNT-CNT welds without destroying the CNT structure is a major challenge.

SUMMARY OF THE INVENTION

A method of functionalizing nanotubes, comprises passing an electrical current through a nanotube film to generate defects on the nanotubes, and exposing the nanotube film to a reactive medium such that at least one chemical functional group is formed at the defects on the nanotubes.

A method of cutting, thinning, or welding nanotubes, comprising passing an electrical current through a nanotube film to at least one of cut, thin or weld the nanotubes in the film.

BRIEF DESCRIPTION OF THE DRAWINGS

FIG. 2 represents SEM images from a CNT film.

DETAILED DESCRIPTION OF THE PREFERRED EMBODIMENTS

Recent publications have explored using eV-keV range ion or electron beams to alter the structure, cut, weld and chemically functionalize CNTs with nanoscopic lateral resolution, to tailor the electrical properties of CNTs and their assemblies. These techniques, however, are difficult to perform because they require the positioning of the energetic beam at the exact location where welding or machining is desired.

The present inventors realized that passing electrical current between two electrodes through a thin film comprised of nanotubes, such as randomly dispersed multiwalled CNTs, can alter the structure and chemically functionalize and tailor the electrical properties of CNTs. That application of current can cut, thin, weld and/or also functionalize the CNTs with various chemical moieties, such as carboxyl and allyl moieties, when subjected to air-exposure. Another embodiment of the invention relates to a method of reducing the resistance of the CNT networks by applying electrical currents.

Preferably by not necessarily, multiwalled CNTs synthesized by arc discharge (for detailed description of arc discharge technique see T. W. Ebbesen, and P. M. Ajayan, Nature, 358, 220, (1992)) were used in following experiments. However, other CNTs such a single walled CNTs and multiwalled CNTs made by other methods may also be used. A film comprised of randomly dispersed CNTs was drop coated over lithographically patterned 100-nm-thick Au pads on oxidized silicon substrates. The Au contact pads patterned by a lift-off technique were used to serve as low-resistance contacts for four point probe measurements, as reported elsewhere (see Z. Yao, C. L. Kane, and C. Dekker, Phys. Rev. Lett., 84, 2941, (2000)). A 50-nm-thick Cr layer was deposited prior to Au deposition to provide enhanced adhesion with the silica surface. Four point probe I-V measurements were carried out using a Keithley 2400 sourcemeter and a Keithley 2000 multimeter in ~$10^{-7}$ Torr vacuum. Currents in the range of 0.1-1 A were applied into the thin film CNT samples. The films were characterized in both plan-view and edge-on configurations by scanning electron microscopy (SEM) using a JEOL 6330F FESEM instrument operated at 5 kV. The structural changes in the CNTs were investigated by transmission electron microscopy (TEM) in Philips CM 12 and CM 20 instruments operated at 120 and 200 kV, respectively, with the latter providing 0.19 nm point-to-point resolution. The chemical changes in the CNTs were studied by Raman spectroscopy using a Renishaw Ramanscope system with a 514 nm Argon laser, and Fourier Transform Infrared (FTIR) spectroscopy in a Nicolet Magna 560-FTIR tool in transmission mode.

Figure 1A:
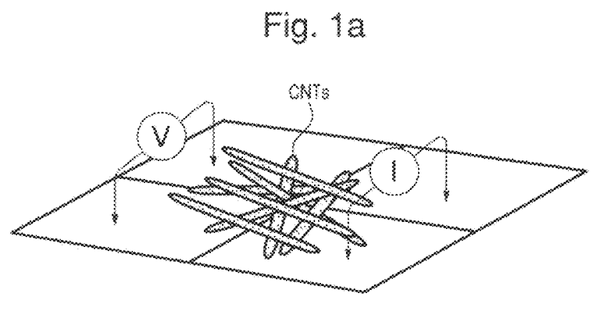
FIG. 1a is a schematic sketch of a CNT film drop-coated over Au pads for 4-pointprobe conductance measurements.
Figure 1B:
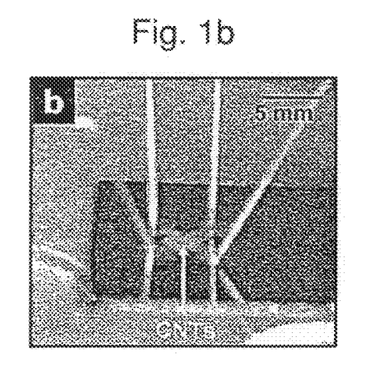
FIG. 1b is an optical photograph of the CNT film contacted with four probes on the gold pads before current exposure.
Figure 1C:
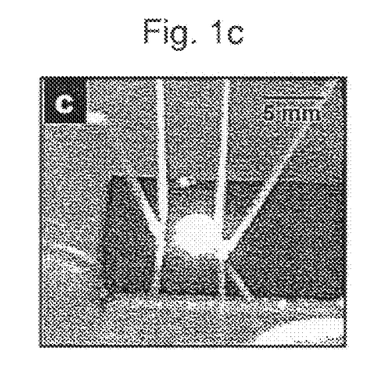
FIG. 1c is an optical photograph of the CNT film contacted with four probes on the gold pads during application of 0.1-1 A current in air, capturing a momentary flash.

Referring to FIG. 1, applying large currents between 0.1 to 1 A through the CNT films in air ambient results in a series of momentary flashes of light followed by circuit breakdown (i.e., a short circuit between the current supplying electrodes). Other suitable current ranges and other oxygen containing ambients, such as pure oxygen, water vapor, etc. may be used instead. While the order-of-magnitude variability in the current at which the flashes is likely due to variations in film homogeneity in different samples, currents <~100 mA did not produce such flashes or result in breakdown in any of the samples investigated. FIGS. 1b and 1c show snapshots of the test structure and the flash generated during current application. Carrying out similar experiments with ~0.1 to 1 A current in a ~$10^{-7}$ Torr vacuum results in a sustained glow emerging from the CNTs, as reported earlier (see J. Q. Wei, H. W. Zhu, D. H. Wu, B. Q. Wei, *Appl. Phy. Lett.*, 84, 4869, (2004)), but suppresses electrical breakdown. The critical current density in the CNT film above which the flashes are observed is estimated to be $10^5$-$10^7$ Acm$^{-2}$, based upon the nanotube density in the film estimated by analysis of SEM images. This current density is two to four orders of magnitude smaller than the $10^9$ Acm$^{-2}$ current densities that can be sustained in individual CNTs (see H. Dai, E. W. Wong, C. M. Lieber, *Science*, 272, 523, (1996)).

Figure 2A:
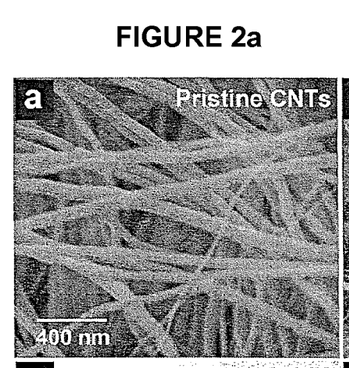
FIG. 2a represents an SEM image before and FIG. 2b represents an SEM image after 0.1-1 A current application. Current-induced CNT-CNT joints are indicated by arrows.
Figure 2B:
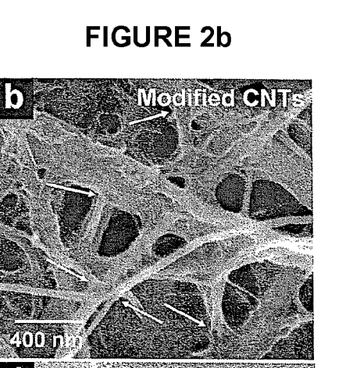
Figure 2C:
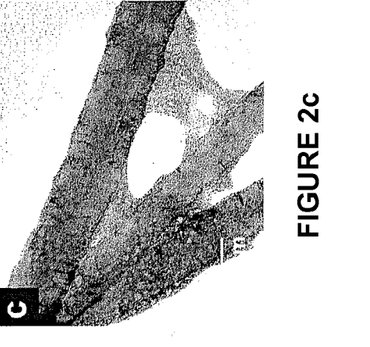
FIG. 2c shows a representative TEM image of close-up views of a CNT-CNT weld held together by amorphous carbon bridges.
Figure 2D:
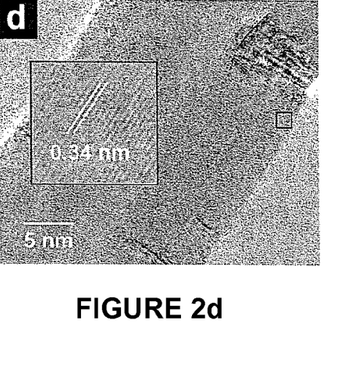
FIG. 2d shows a large diameter (~100 nm) CNT with the hollow intact. Inset in FIG. 2d shows that the crystallinity is preserved after current modification.
Figure 3A:
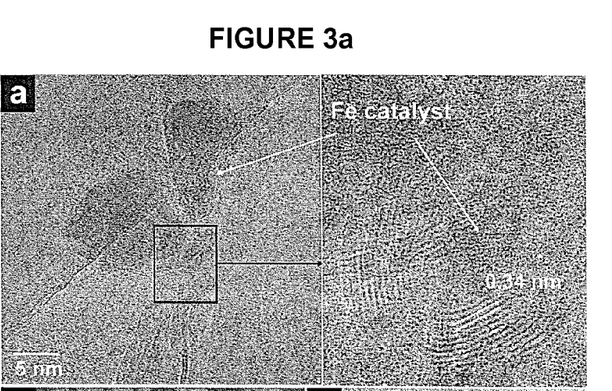
FIG. 3a is a TEM image of carbon onions on Fe catalyst nanoparticles near the weld site. Inset shows crystalline structure of a carbon onion.
Figure 3B:
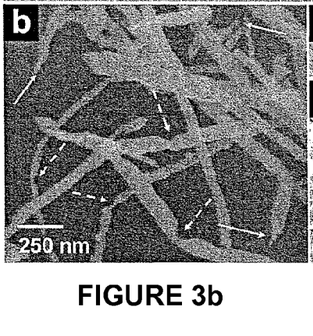
FIG. 3b is a SEM image showing thinning and rupture of CNTs shown by dashed and solid arrows, respectively.
Figure 3C:
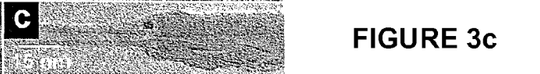
FIG. 3c shows a TEM image of a thinned down CNT.
Figure 3D:
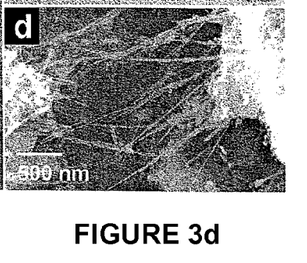
FIG. 3d shows a SEM image showing alignment and rupture of CNTs.

SEM analyses in FIG. 2a and FIG. 2b reveal that applying 0.1-1 A current results in structural and morphological changes in the CNT films. No observable changes are seen for <~100 mA currents, when no flashes were observed, indicating that the morphological changes are related to the flashes. FIG. 2b illustrates an examples of current-induced welding of overlapping CNTs (see arrows). TEM micrographs from samples subjected to high current densities confirm the formation of CNT welds (see FIG. 2c). At the CNT welds, we observe a coating of amorphous carbon that is presumably deposited from carbon flux from electromigration, thinning and rupture of smaller diameter CNTs present in the neighborhood. The amorphous carbon coating is analogous to the coating of a feed material used in metal joining, and is different from current-induced spot-welding observed in singlewalled CNTs where no amorphous carbon formation is observed. The crystalline structure along the length of the CNT is, however, preserved in regions away from the welds as illustrated in FIG. 2d, indicating that the structural changes can be restricted to the CNTs joints. In some instances, we also observe graphitic carbon onions (see FIG. 3a), mainly on Fe nanoparticles, suggesting that the remnant catalysts promote onion formation. Many CNTs are either thinned or ruptured near the welds (see FIGS. 3b and 3c), likely by vaporization and electromigration of carbon atoms, induced by high current densities and resultant joule heating. In locations where only a few CNTs bridge different portions of the sample, the CNTs tend to align, likely due to the effect of high local electric fields, prior to rupture (see FIG. 3d). All the observed morphological changes are observed in experiments conducted in vacuum, or in air, suggesting the negligible effect of these ambients on current-induced structural changes (however, the experiments conducted in vacuum did not lead to electrical breakdown of the CNT film).

Without wishing to be bound by any particular theory, it is believed that current-induced structural changes of CNTs can be understood as follows. The high CNT-CNT resistance due to the lack of direct electron transport pathways across overlapping CNTs facilitates welding by joule heating and arcing induced by high currents at points proximal to the overlap. Additionally, catalyst particles and locations of Stones-Wales type defects on the CNTs could also serve as hot spots. The nature of the structural change, e.g., welding vs. fissure, is likely to be determined by many factors such as CNT diameter, local current density and distance from the next CNT, similar to ion-beam-induced structural changes.

Figure 4A:
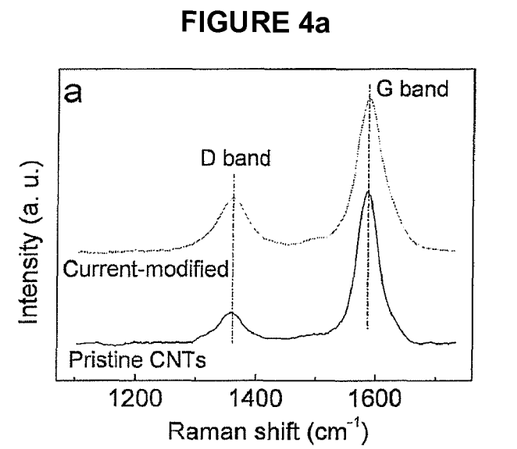
FIG. 4a shows a Raman spectra of CNTs showing an increase in the D- to G-band intensity ratio upon current application.
Figure 4B:
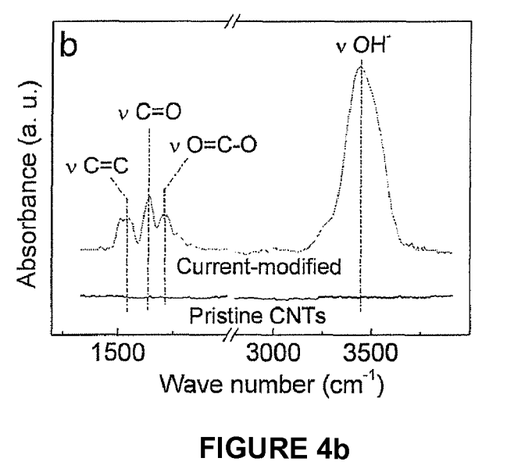
FIG. 4b is a FTIR spectra revealing CNT functionalization upon current application in air, in contrast to the featureless spectrum from pristine CNTs. Current application in vacuum followed by air exposure yielded the same result.

Turing to FIG. 4, Raman (FIG. 4a) and FTIR (FIG. 4b) spectroscopy show that high current densities lead to the creation of defects such as vacancies and dangling bonds in CNTs, which upon air-exposure, such as during and/or after the current application, result in the functionalization of the CNT surfaces. In particular, the ratio between the intensities of the D (1360 cm$^{-1}$) and G (1584 cm$^{-1}$) bands increases from 0.20 to 0.35 upon applying ~0.1-1 A current. This result, summarized in FIG. 4a, indicates an increase in sp$^3$ carbon, signifying an increase in the extent of disorder in the CNTs due to the creation of Stones-Wales type defects and out-of-basal-plane dangling bonds. Upon air exposure, these defects sites serve as fertile high-reactivity sites for the formation of O—H, O=C—OH, C=O and C=C moieties on the CNT surfaces, via reaction with oxygen and/or moisture. FIG. 4b shows representative FTIR spectra from CNT films subject to the application of ~0.1-1 A current and subsequently exposed to air. The characteristic signatures of hydroxyl, carboxyl, carbonyl and allyl moieties (chemical groups) are clearly seen at ~3440, 1710, 1640, and 1540 cm$^{-1}$, respectively. In contrast, pristine CNTs do not show any detectable signatures of these moieties. Without wishing to be bound by any particular theory, it is believed that current application combined with air exposure functionalizes the CNTs near the hot-spots where dangling bonds have been created. The functionalization of CNTs with hydrophilic groups (e.g., carboxyl groups) in selected locations (e.g., at the welds) is attractive from the viewpoint of designing chemical and biological sensors using CNTs. While exposure to oxygen and moisture (i.e., water or water vapor) ambients can generate of hydroxyl, carboxyl, carbonyl and/or allyl moieties, exposure to other reactive ambients, such as reducing ambients, can generate other suitable moieties.

Figure 5A:
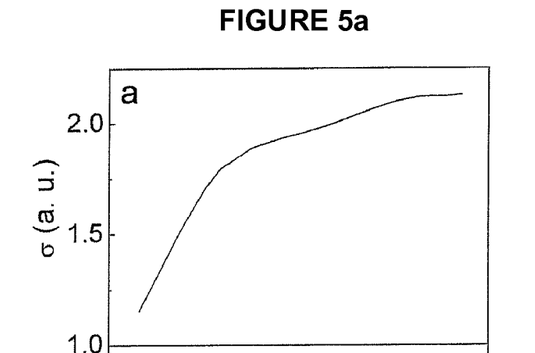
FIG. 5a is a representative graph capturing the changes in the electrical conductance σ, normalized to the value measured at t=0.
Figure 5B:
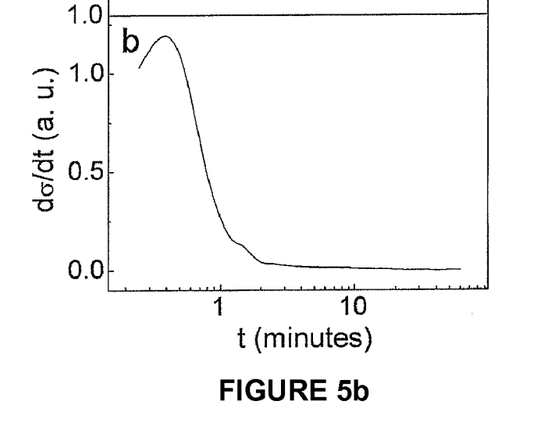
FIG. 5b is a graph showing the rate of conductance change dσ/dt, as a function of time t, during the application of a constant current of 0.5 A into a film of randomly dispersed CNTs. Similar characteristics were obtained from other films applied with different current values in the range of 0.1-1 A.

Referring to FIG. 5a, conductance-voltage (σ-V) characteristics obtained by four-point-probe measurements during the application of current reveal a monotonic irreversible increase in σ by ~150%, followed by saturation. The conductance gradient dσ/dt>0, and is the highest for the first minute of current application (see FIG. 5b), indicating that most of the structural and chemical changes occur during this time-frame. The net increase in conductance is contrary to the reverse trend expected from defect creation, fissures and functionalization of the CNTs. Without wishing to be bound by any particular theory, the present inventors believe that this observation indicates that the increase in the number of high conductance pathways due to the formation of CNT-CNT junctions effectively offsets the conductance decrease expected from defect scattering, functionalization, and fracture of CNTs. The present inventors expect that multishell transport facilitated by the bridging of adjacent shells within each CNT, and between CNTs at welds, provide the mechanism for the observed conductance increase.

Figure 6A:
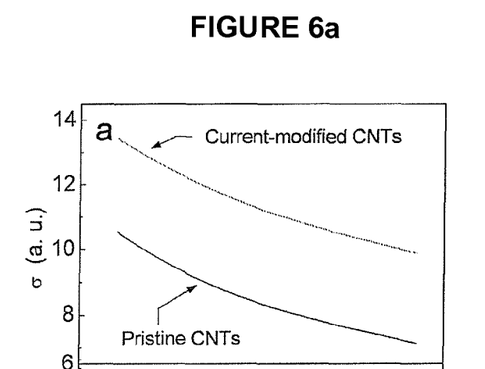
FIG. 6a shows variations of total conductance σ and FIG. 6b shows the variation of thermally-activated conductance component $\sigma_1$ as a function of temperature.

FIG. 6a shows the electrical conductance of pristine and current-modified CNTs measured at different temperatures 25° C.≤T≤350° C. Without wishing to be bound by any particular theory, the behavior can be described by $$\sigma = \sigma_o \exp\left[-\frac{E_A}{k_B T}\right] + \sigma_2,$$

where the first term, designated as σ1, reveals thermally activated transport across CNT shells, with an activation energy $E_A$ (see S. Agrawal, M. J. Frederick, F. Lupo, P. Victor, O. Nalamasu, G. Ramanath, Adv. Func. Mat., 15, 1922 (2005). Also see P. G. Collins, P. Avouris, AIP Conference Proceedings, 633, 223 (2002))

Figure 6B:
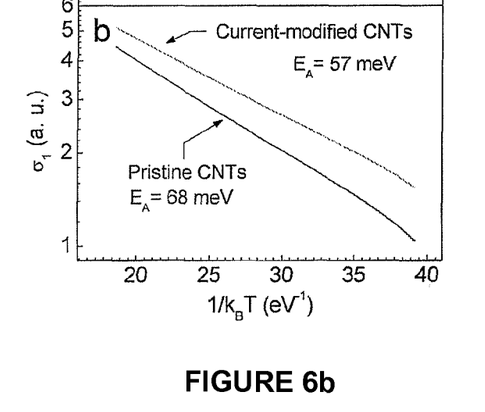

Without wishing to be bound by any particular theory, we attribute the enhanced transport to the cross-linking of CNTs by the dangling bonds created at the high-current density hot-spots. Current-induced bridging of CNTs decreases $E_A$ slightly from 65±5 to 50±8 meV (see FIG. 6b). Although the current applied to induce structural modification ranged from 0.1-1 A for different samples, the systematic current-induced decrease in $E_A$ from pristine samples was reproducible in all of the 10 samples studied. This result indicates that the current-induced change in conductance is insensitive to the actual configuration of the CNTs in randomly dispersed networks prepared by drop coating.

Current-induced conductivity enhancement at CNT-CNT contacts could be useful for creating mesoscale networks of device wiring with CNTs placed at specific locations by other techniques. Apart from increasing the conductance, creation of welds could also improve the mechanical properties of CNT networks, and facilitate their use as high toughness reinforcers that are more amenable to integration with nanocomposite matrices.

The foregoing description of the invention has been presented for purposes of illustration and description. It is not intended to be exhaustive or limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents. All journal articles mentioned herein are incorporated by reference in their entirety.

What is claimed is:

1. A method of increasing conductance of nanotube film comprising:
    passing an electrical current through a nanotube film to generate defects on the nanotubes; and
    exposing the nanotube film to a reactive medium that is selected from the group consisting of air ambient, oxygen ambient, or water vapor ambient, such that at least one chemical functional group is formed at the defects on the nanotubes;
    wherein after the current has passed through the nanotube film and the at least one chemical functional group has formed, the nanotube film exhibits a conductance higher than the conductance of the nanotube film prior to the passing of the current and formation of the at least one chemical functional group.

2. The method of claim 1, wherein the film comprises a film of randomly dispersed multiwalled carbon nanotubes.

3. The method of claim 2, wherein the reactive medium is the air ambient.

4. The method of claim 3, wherein:
    the current is in a range of 0.1-1 A; and
    the medium comprises at least one of air and water vapor.

5. The method of claim 1, wherein the defects comprise dangling bonds and the at least one chemical functional groups comprises a hydrophilic group.

6. The method of claim 1, wherein the at least one chemical functional group comprises at least one of hydroxyl, carboxyl, carbonyl and allyl groups.

7. The method of claim 1, wherein the step of passing an electrical current through the nanotube film and the step of exposing the nanotube film to a reactive medium are conducted consecutively.

8. The method of claim 1, wherein the step of passing an electrical current through the nanotube film and the step of exposing the nanotube film to a reactive medium are conducted simultaneously.

9. The method of claim 1, wherein:
    the nanotube film is in electrical contact with a first conductive pad and a second conductive pad;
    the step of passing the electrical current through the nanotube film comprises passing the electrical current between the first conductive pad and the second conductive pad; and
    resistance of the nanotube film between the first conductive pad and the second conductive pad decreases during the step of passing the electrical current between the first conductive pad and the second conductive pad.

* * * * *